United States Patent [19]
Bell et al.

[11] Patent Number: 5,929,943
[45] Date of Patent: *Jul. 27, 1999

[54] AUTOMATIC PLUG-IN INDICATOR DIMMER

[75] Inventors: Isaac Michael Bell; Boguslaw Kozakiewicz, both of Indianapolis, Ind.

[73] Assignee: Thomson Consumer Electronics, Inc., Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/579,941

[22] Filed: Dec. 28, 1995

[51] Int. Cl.⁶ ........................................ H04N 5/63
[52] U.S. Cl. .................. 348/730; 340/815.45; 345/46; 345/82
[58] Field of Search ..................... 348/730, 553, 348/372; 340/333, 425.2, 407.2, 815.4, 815.44, 815.45; 345/46, 82, 147; 362/20, 31; 455/572, 574; H04N 5/63

[56] References Cited

U.S. PATENT DOCUMENTS

| | | | |
|---|---|---|---|
| 3,882,401 | 5/1975 | Cleland | 327/547 |
| 4,181,915 | 1/1980 | Lagoni | 358/27 |
| 5,017,837 | 5/1991 | Hanna et al. | 315/136 |
| 5,032,946 | 7/1991 | Misencik et al. | 361/56 |
| 5,319,359 | 6/1994 | Zampini | 340/815.45 |
| 5,459,478 | 10/1995 | Bolger et al. | 340/815.45 |

*Primary Examiner*—Michael Lee
*Attorney, Agent, or Firm*—Joseph S. Tripoli; Peter M. Emanuel; Paul P. Kiel

[57] ABSTRACT

In a television system, including a standby power supply coupled directly to an AC power input and a main power supply coupled via an on/off switch to the AC power input, a source of light is illuminated at a first brightness level in response to the standby power supply being connected to an AC source and illuminated at a lower brightness level in response to the main power supply being connected to the AC power source.

10 Claims, 3 Drawing Sheets

5,929,943

AUTOMATIC PLUG-IN INDICATOR DIMMER

FIELD OF THE INVENTION

This invention relates to visual indicators generally and particularly to visual indicators used to indicate if an electronic apparatus is connected to an AC power source.

BACKGROUND OF THE INVENTION

An electronic apparatus may be disconnected from an AC power source ("OFF" mode), connected to the AC power source ("STANDBY" mode) or energized for use ("ON" mode). Safety regulations in some countries require consumer electronic product such as television receivers to have at the front panel an indicator light which is illuminated as soon as the television receiver is plugged into an AC power outlet. This indicator light should be bright enough to be seen in a well-lighted room and visible from different angles to warn the owner that the television receiver is plugged in. The indicator is provided so that if, e.g., the owner leaves home for a protracted period of time, there is a reminder to unplug the receiver.

Various indicator systems are known. For example, in television receivers manufactured for the domestic Japanese market it is known to use a combination of red and green light emitting diode (LED) indicators to visually indicate the three modes as follows: if both LEDs are off (dark), then the receiver is in the OFF mode (unplugged); if the red LED is on and the green LED is off, then the receiver is in the STANDBY mode; and if the red LED is off and the green LED is on, then the receiver is in the ON mode. Other known techniques include illuminating a single red LED to indicate both the STANDBY and ON modes, illuminating a single red LED only in STANDBY mode, and using one segment of a seven segment LED to indicate STANDBY mode where the seven segment display normally indicates a tuned channel number in the ON mode.

One of the deficiencies in the above indicator systems is the fact that two LEDs may be necessary, thereby increasing the cost of the indicator system. Another deficiency is the distracting affect of an indicator to a viewer of a television system. Since the STANDBY and ON mode indicators must be visible in a well lit room, one or more of the indicators may have a distracting affect when a viewer is watching television in a dimly lit room. It is therefore desirable to implement a mode indicating system using only one indicating light source (e.g., an LED). It is also desirable to reduce the distracting influence of the mode indicator on the user of apparatus equipped with the indicator system.

SUMMARY OF THE INVENTION

The present invention is in part based on the recognition that, in an electronic apparatus, including a display device, a STANDBY mode (connected to an AC power source) is indicated by an LED at a first brightness level and an ON mode (apparatus energized for use) is indicated by the LED at a second brightness level, which is lower than the first brightness level.

BRIEF DESCRIPTION OF THE DRAWINGS

The invention will be described with reference to the accompanying Drawing, in which.

Like reference designators in the various Figures refer to the same or similar elements.

DETAILED DESCRIPTION

The invention will be described in terms of a television receiver, however, it should be appreciated that it is applicable to any electronic equipment where a power-on indicator is desired.

Figure 1:
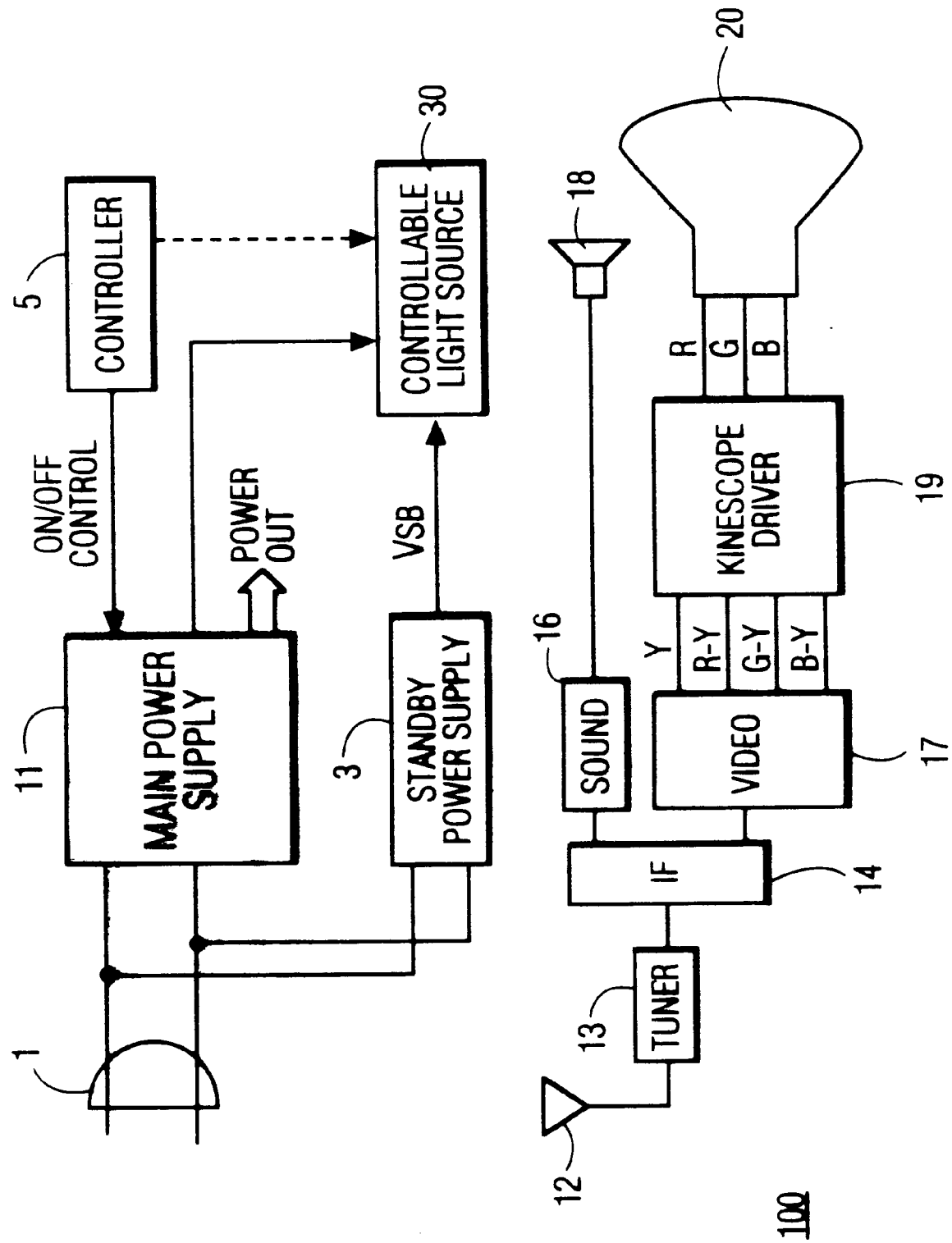
FIG. 1 shows a block diagram of a television receiver including the invention.

Referring to FIG. 1, a television receiver 100 receives RF signals from an antenna 12. The RF signals are coupled to a tuner 13 where they are combined with a local oscillator signal having a frequency controlled in accordance with the channel selected by a viewer to produce an IF signal. The IF signal is coupled to an IF signal processor 14. A portion of the IF signal is coupled to a sound processing circuit 16 and converted to an audio response by a speaker 18. Another portion of the IF signal is coupled to a video processing circuit 15 which includes a luminance processing section (not shown) and a chrominance processing section (not shown). The luminance processing section removes luminance signal representing picture transition and tone information from the IF signal, amplifies the luminance signal and couples the amplified luminance signal Y to a kinescope driver 19.

The chrominance processing section removes chrominance signals representing picture color information from the IF signal. The chrominance signals are then amplified and demodulated to form color difference signals R-Y, G-Y, B-Y which are then coupled to the kinescope driver 19. The kinescope driver includes three amplifier arrangements (not shown) for combining the color difference signals with the luminance signal to form color signals representing red R, blue B and green G picture information. The color signals are applied to a kinescope 20 which produces corresponding electronic beams. Deflection circuitry (not shown) controls the three electronic beams to produce an image on the screen of the kinescope 20.

Television receiver 100 includes a controllable light source 30 which is used to indicate a mode of operation of the television receiver. As previously discussed, there are three modes of operation: OFF mode, in which the television is disconnected from an AC power source; STANDBY mode, in which the television is connected to an AC power source; and ON mode, in which the television is energized for use by the viewer. When the light source 30 is not illuminated the receiver is in the OFF mode. The STANDBY mode is indicated by the light source 30 emitting light at a first brightness level. This first brightness level is, illustratively, bright enough to be seen in a well lighted room and visible from different angles. The illuminated light source 30 warns the owner that the television receiver is plugged in and should therefore be unplugged if, e.g., the owner leaves home for a protracted period of time. The ON mode is indicated by the light source 30 emitting light at a second brightness level. This second brightness level is, illustratively, dimmer than the first level such that a television viewer will not be distracted by the light source while viewing television images. However, this second brightness level should be sufficient to indicate that the television receiver is in the ON mode even if there is no displayed image.

Details of the arrangement for controlling the light source 30 will now be described. Television receiver 100 includes a plug 1 having two conductors for coupling AC power from an external AC power source (not shown) to a standby power supply 3 and a main or "run" power supply 11. The standby power supply 3 provides a DC standby voltage $V_{SB}$, which is typically between 3 and 15 Volts. The standby power supply is energized when plug 1 is plugged into the external AC power source. The controllable light source 30 is coupled to the standby power supply 3 and is illuminated at a first brightness level when the plug 1 is plugged into the external AC power source (STANDBY mode).

The main power supply 11 provides various DC voltages, indicated as POWER OUT, for the circuitry within the television receiver 100. The main power supply 11 is energized in response to a control signal ON/OFF CONTROL from a controller 5. The main power supply 11 produces the various "run" (ON mode) supply voltages for the television receiver circuitry, including tuner 13, IF processor 14, sound processor 16, video processor 17, kinescope driver 19, display device 20 and other non-standby-mode circuitry. The main supply 11 is also coupled to the controllable light source 30. The controllable light source 30 is responsively illuminated at a second, lower brightness level when the main power supply is energized (ON mode). As indicated by the dashed line in FIG. 2, the light source 30 may also be controlled by the controller 5 directly.

Figure 2:
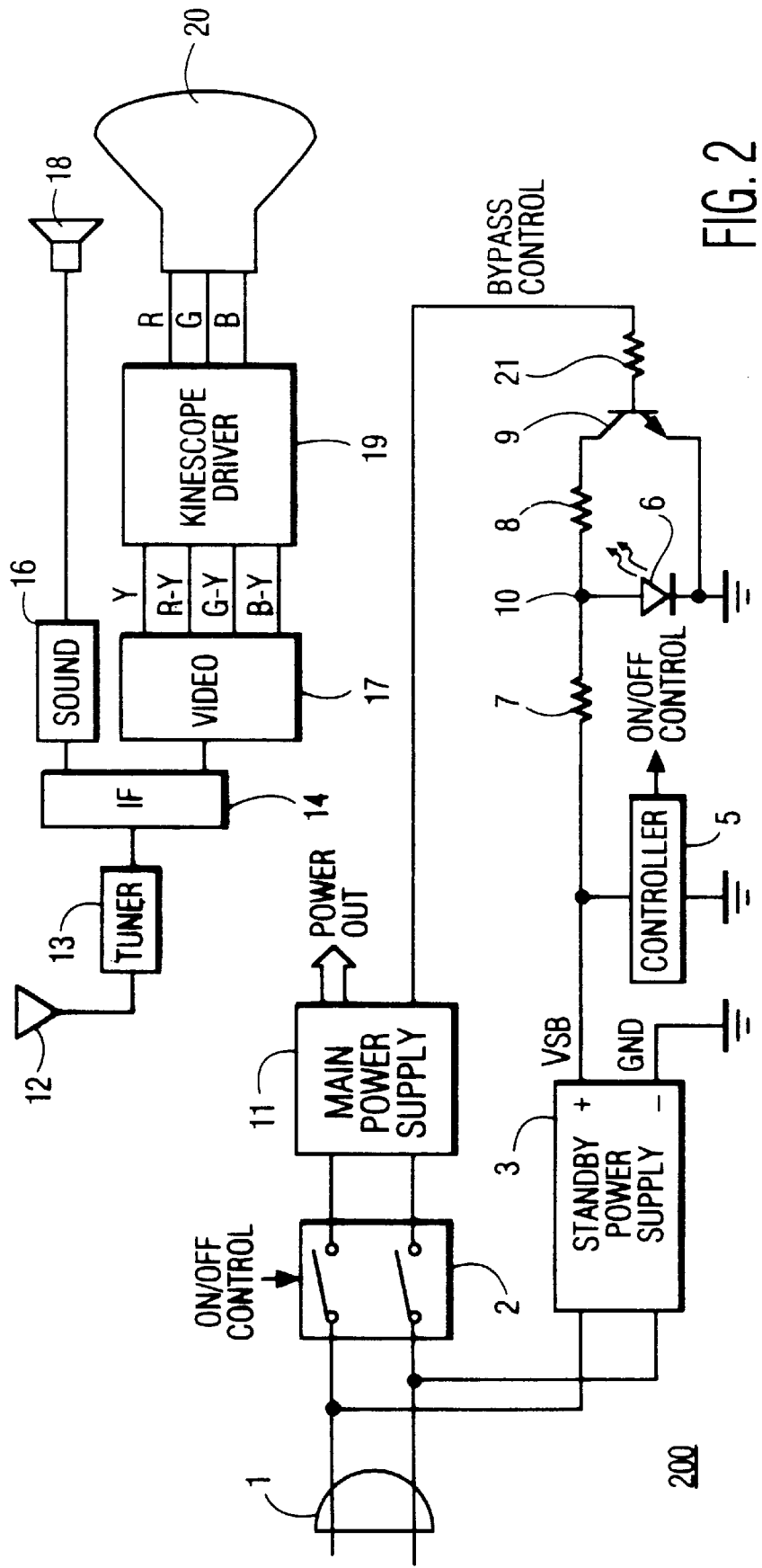
FIG. 2 shows a block diagram of a television receiver including a circuit embodying the invention.

Referring to FIG. 2, a television receiver 200 similar to the television receiver 100 described above is shown. Television receiver 200 includes an LED 6 which is used to indicate a mode of operation of the television receiver. The LED must be visible, e.g., a red LED. Television receiver 200 includes a plug 1, a standby power supply 3 and a controller 5 which operate in the same manner as previously described with respect to television receiver 100. However, in television receiver 200 a power switch 2 couples the AC power source to the main power supply 11. In addition, the power switch 2 (not the main power supply) is responsive to a control signal ON/OFF CONTROL produced by the controller 5.

When plug 1 is connected to an AC power source while power switch 2 is open (STANDBY mode), alternating current flows to the standby power supply which produces the standby voltage $V_{SB}$. A current limiting resistor 7 is coupled between $V_{SB}$ and a node 10. An anode of the LED is coupled to node 10, and a cathode of the LED is connected to ground 4. The LED emits light when a current flows through it from the anode to the cathode. The brightness of the light produced by the LED is proportional to the current flowing through the LED. The current flowing through the LED, and therefore the brightness level, is limited by the limiting resistor 7 to a predetermined level.

When power switch 2 is closed (ON mode) in response to the control signal ON/OFF CONTROL, main power supply 11 is energized and provides the various "run" supply voltages to the television receiver circuitry. Main power supply 11 also produces a signal BYPASS CONTROL which indicates that the television receiver is in the ON mode, i.e., viewing mode.

The BYPASS CONTROL signal is coupled to a bypass switch 9, comprising a bipolar transistor, via base resistor 21. Bypass switch 9 is connected in series with a bypass resistor 8, and the two elements are together coupled in parallel with the LED. When the BYPASS CONTROL signal is relatively positive, bypass switch 9 is closed, thereby coupling the bypass resistor 8 in parallel with the LED. A current passes through the bypass resistor 8 from node 10 to ground 4, thereby reducing the current flowing through the LED and diminishing the brightness of the LED.

Figure 3:
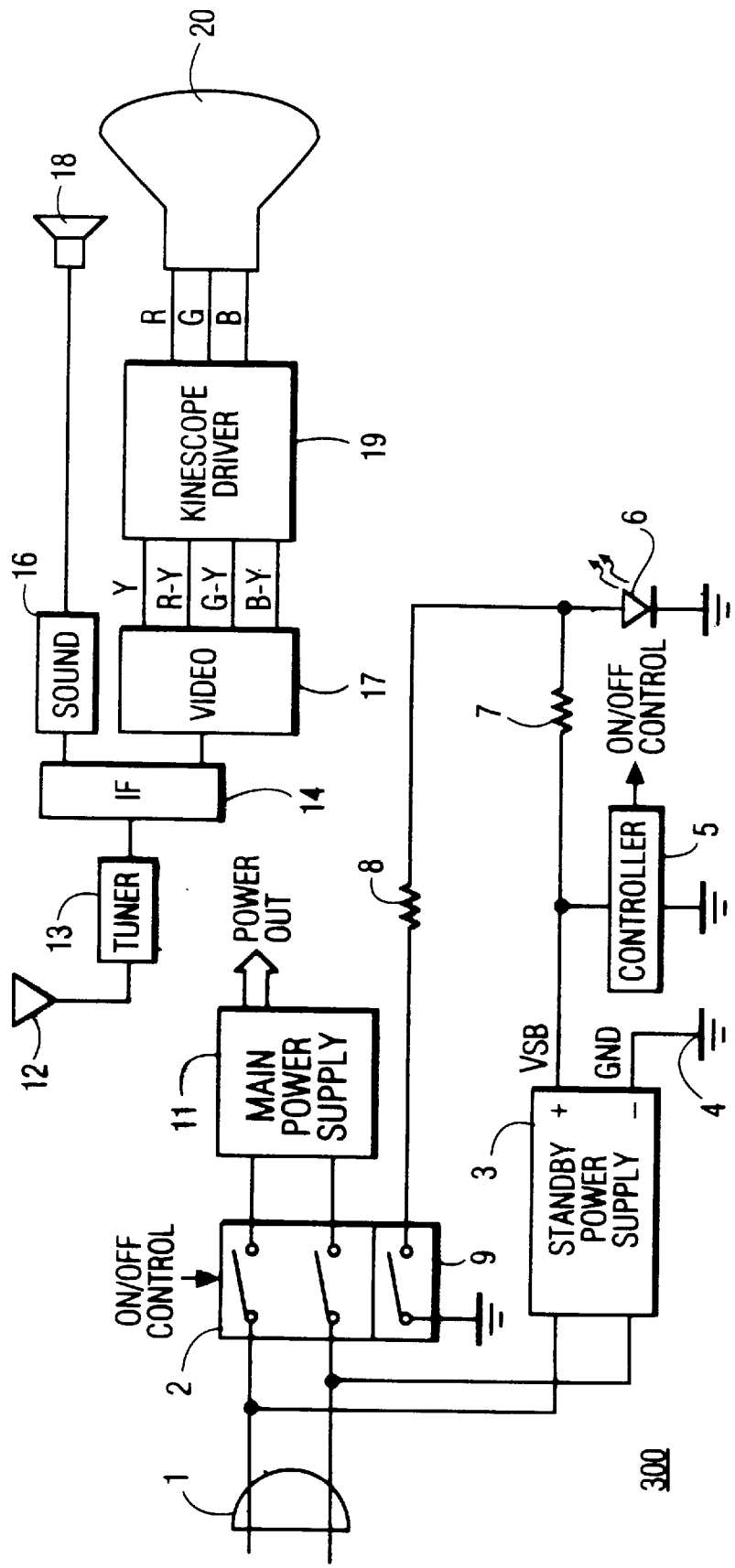
FIG. 3 shows a block diagram of a television receiver including another circuit embodying the invention.

Referring to FIG. 3, another embodiment of the invention is shown. The transistor switch 9 of television receiver 200 has been replaced by adding a third pole on a "ganged" power switch 2. When power switch 2 is closed (ON mode) in response to the control signal ON/OFF CONTROL the "ganged" switch 9 is closed at the same time, thereby connected bypass resistor 8 to ground and reducing the brightness of LED 6. This embodiment does not require the BYPASS CONTROL signal found in television receiver 200 or the base resistor 21.

The invention provides several advantages over the prior art. For example, the invention requires only one light source to indicate which the operating mode (i.e., OFF, STANDBY or ON) of an electronic apparatus. The invention also reduces the distracting affect of the mode indicator by providing a second (lower) brightness level during the ON mode of operation.

It will be apparent to those skilled in the art, that although the invention has been described in terms of specific examples, modifications and changes may be made to the disclosed embodiments without departing from the essence of the invention. For example, bypass switch 9, which is shown as an NPN transistor, may be another type of transistor, a mechanical switch or any other suitable switching device.

Another modification would be the use of a second current limiting resistor in series with limiting resistor 7. This second current limiting resistor could be bypassed (shorted) with a parallel-connected switch during the STANDBY mode, such that only the limiting resistor 7 affected the current flow to the LED. During the ON mode the parallel-connected switch would be open, thereby forcing the current to the LED to flow through both limiting resistors and consequently reducing the brightness of the LED.

Another modification would be the use of a different light source (e.g., incandescent light). The invention only requires that the light source be controllable to supply two brightness levels. Moreover, a fixed brightness level light source could be used if the brightness could be reduced by, e.g., inserting an optical filter between the light source and the viewer in response to the ON mode of the electronic apparatus.

It must also be noted that controller 5 may be electronic or mechanical. For example, the controller could be a microprocessor coupled to an associated keyboard (or remote control receiver) or an ON/OFF push-button switch which provides a mechanical actuation of the power switch 2.

These and other modifications are intended to be within the scope of the resent invention defined in the following claims.

We claim:

1. Video display apparatus comprising:

a display device for displaying a video image;

a first power supply for supplying a first supply voltage for said apparatus when said first power supply is coupled to a source of AC power;

a second power supply adapted to be selectively enabled for supplying a second supply voltage for said apparatus when said second power supply is coupled to said source of AC power; and an indicator operatively coupled to said first power supply and said second power supply for providing illumination having a first brightness level when said first power supply supplies said first supply voltage and said second power supply is not enabled to supply said second supply voltage, and a second brightness level when said second power supply is enabled to supply said second supply voltages, wherein said first brightness level indicates a standby mode of operation of the system, said second brightness level indicates an ON mode of operation of the apparatus during which an image is displayed on said display device, and second brightness level being lower than said first brightness level.

2. The apparatus as recited in claim 1 wherein said indicator comprises a light emitting diode (LED).

3. The apparatus as recited in claim 2 wherein said indicator further comprises:

a resistor and a switch connected in series between an anode of said LED and a cathode of said LED, said switch closing in response to a signal from said second power supply.

4. The apparatus as recited in claim 3 wherein said switch comprises a transistor.

5. Video display apparatus comprising a display device for displaying a video image;

means for receiving AC power;

means, coupled to said power receiving means, for processing power, said power processing means adapted to be enabled to supply processed power to said display device;

means, coupled to said receiving means and said power processing means, for indicating an operating state of said power processing means, said indicating means providing illumination having a first brightness level for indicating that AC power is being received and said power processing means is not enabled, and having a second brightness level for indicating that said power processing means is enabled to supply said processed power, wherein said first brightness level indicates a standby mode of operation of the system, said second brightness level indicates an ON mode of operation of the apparatus during which an image is displayed on said display device, said second brightness level being lower than said first brightness level and having an intensity for preventing distraction of a user viewing said image displayed on said display device by said illumination of said indicator.

6. The apparatus as recited in claim 5 wherein said indicating means comprises a light emitting diode (LED).

7. The apparatus as recited in claim 6 further comprising:

a resistor and a switch connected in series between an anode of said LED and a cathode of said LED, said switch closing in response to a signal from said power processing means.

8. The apparatus as recited in claim 7 wherein said switch comprises a transistor.

9. Video display apparatus comprising:

a display device for displaying a video image:

first and second power supplies adapted to be connected to a power source for providing first and second supply voltages, respectively, the first power supply providing the first supply voltage when the first power supply is connected to the power source, the second power supply selectively enabled to provide the second supply voltage when the second power supply is connected to the power source and enabled by a user command, and an indicator apparatus comprising:

a light source capable of providing one of first and second brightness levels in response to a control signal; and means, operatively connected to said light source and the first and second power supplies, for controlling said brightness level of said light source, said controlling means generating said control signal to thereby control said brightness level in response to the operating state of the first and second power supplies, wherein said first brightness level indicates a standby mode of operation of the apparatus, said second brightness level indicates an ON mode of operation of the apparatus during which an image is displayed on said display device, said second brightness level being lower than said first brightness level and having an intensity for preventing distraction of a user viewing said image displayed on said display device by said illumination of said light source.

10. The apparatus of claim 1 wherein said indicator during said ON mode of operation provides an illumination of an intensity for preventing distraction of a user viewing said image displayed on said display device by said illumination of said indicator.

* * * * *